United States Patent
Yamamoto et al.

(10) Patent No.: US 10,310,307 B2
(45) Date of Patent: Jun. 4, 2019

(54) LIQUID CRYSTAL DISPLAY APPARATUS

(71) Applicant: SHARP KABUSHIKI KAISHA, Sakai, Osaka (JP)

(72) Inventors: Kenichiroh Yamamoto, Sakai (JP); Makoto Hasegawa, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/807,325

(22) Filed: Nov. 8, 2017

(65) Prior Publication Data

US 2018/0136501 A1  May 17, 2018

(30) Foreign Application Priority Data

Nov. 11, 2016 (JP) .................... 2016-220441

(51) Int. Cl.
G02F 1/133 (2006.01)
G09G 3/36 (2006.01)
G02F 1/1343 (2006.01)

(52) U.S. Cl.
CPC ....... G02F 1/13306 (2013.01); G09G 3/3648 (2013.01); G02F 2001/134345 (2013.01); G09G 2320/028 (2013.01); G09G 2320/0247 (2013.01)

(58) Field of Classification Search
CPC .... G02F 1/13306; G02F 2001/134345; G09G 2320/028; G09G 3/3648; G09G 2320/0247

See application file for complete search history.

(56) References Cited

U.S. PATENT DOCUMENTS

2010/0103204 A1* 4/2010 Shibata ................ G09G 3/3406
                                                          345/690
2011/0254759 A1* 10/2011 Mori .................... G09G 3/3607
                                                          345/88
2014/0118423 A1   5/2014 Hasegawa et al.

FOREIGN PATENT DOCUMENTS

WO    2010/071221 A1    6/2010

* cited by examiner

Primary Examiner — Hong Zhou
(74) Attorney, Agent, or Firm — ScienBiziP, P.C.

(57) ABSTRACT

A liquid crystal display apparatus includes a liquid crystal panel including pixels each having sub-pixels numbered in n (n is an integer of two or greater), a viewing angle improvement circuit, and a processing object determination circuit. The processing object determination circuit determines a pixel as a non-object for viewing angle improvement processing if gradation values, in input video signals for the pixel, for the sub-pixels satisfy specified conditions prescribing gradation values for the sub-pixels causing no changes in color tones between views of a display surface of the panel from front and diagonal directions and determines a pixel as an object for the processing if the gradation values do not satisfy the conditions. The viewing angle improvement circuit performs the processing for the input gradation values for the pixels determined as the objects and does not perform the processing for the values for the pixels determined as the non-objects.

5 Claims, 9 Drawing Sheets

LIQUID CRYSTAL DISPLAY APPARATUS

BACKGROUND

1. Field

The present disclosure relates to a liquid crystal display apparatus including a liquid crystal panel.

2. Description of the Related Art

A liquid crystal display apparatus that includes a liquid crystal panel and that is configured to improve a viewing angle of the liquid crystal panel has been known. As disclosed in International Publication No. 2010/71221, for instance, such a liquid crystal display apparatus exercises so-called time-division gradation control in which a gradation is changed for each sub-pixel in each pixel on a time-division scheme (every display frame, for instance).

In case where the time-division gradation control is performed as in the configuration disclosed in International Publication No. 2010/71221, the viewing angle of a display surface can be improved by alternate display of a high-gradation image and a low-gradation image. In the time-division gradation control, however, contrast in the gradations of the images is so greatly changed that flickering may be prone to occur.

SUMMARY

In a liquid crystal display apparatus including a liquid crystal panel, it is desirable to improve viewing angle characteristics of an entire display surface while reducing harmful effects such as flickering that is produced by viewing angle improvement control.

An aspect of a liquid crystal display apparatus of the disclosure includes: a liquid crystal panel including a plurality of pixels each including sub-pixels numbered in n (n is an integer equal to or greater than two); a viewing angle improvement circuit that carries out viewing angle improvement processing in which switching between high-gradation display with conversion into a gradation higher than a gradation specified by video signals to be inputted into each of the plurality of pixels and low-gradation display with conversion into a gradation lower than the gradation specified by the video signals is carried out every frame, for each of the plurality of pixels; and a processing object determination circuit that determines, for each of the plurality of pixels, that the pixel is a non-object for the viewing angle improvement processing in case where gradation values, included in the video signals for the pixel, for the sub-pixels numbered in n satisfy specified conditions prescribing gradation values for the sub-pixels numbered in n which gradation values cause no changes in color tones between views of a display surface of the liquid crystal panel from a front direction and from a diagonal direction and that determines that the pixel is an object for the viewing angle improvement processing in case where the gradation values included in the video signals satisfy none of the specified conditions. The viewing angle improvement circuit inputs the video signals, having undergone the viewing angle improvement processing for the gradation values in the video signals for the pixels, into only the pixels determined as the objects for the viewing angle improvement processing by the processing object determination circuit.

DESCRIPTION OF THE EMBODIMENTS

Figure 1:
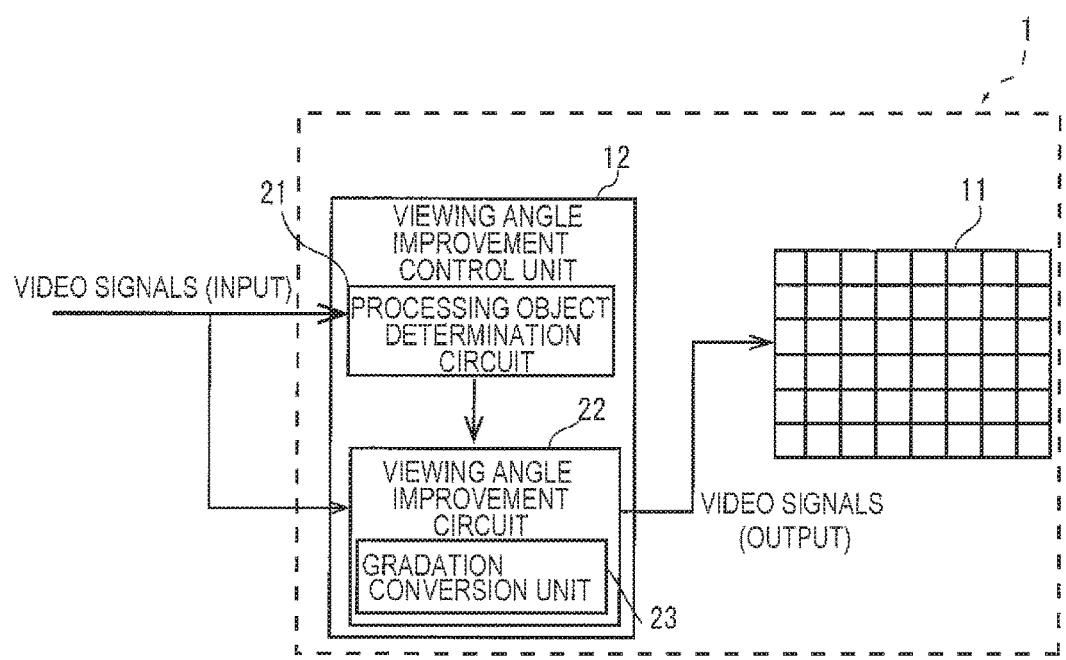
FIG. 1 is a block diagram illustrating a schematic configuration of a liquid crystal display apparatus according to a first embodiment.

A liquid crystal display apparatus according to an embodiment of the disclosure includes: a liquid crystal panel including a plurality of pixels each including sub-pixels numbered in n (n is an integer equal to or greater than two); a viewing angle improvement circuit that carries out viewing angle improvement processing in which switching between high-gradation display with conversion into a gradation higher than a gradation specified by video signals to be inputted into each of the plurality of pixels and low-gradation display with conversion into a gradation lower than the gradation specified by the video signals is carried out every frame, for each of the plurality of pixels; and a processing object determination circuit that determines, for each of the plurality of pixels, that the pixel is a non-object for the viewing angle improvement processing in case where gradation values, included in the video signals for the pixel, for the sub-pixels numbered in n satisfy specified conditions prescribing gradation values for the sub-pixels numbered in n which gradation values cause no changes in color tones between views of a display surface of the liquid crystal panel from a front direction and from a diagonal direction and that determines that the pixel is an object for the viewing angle improvement processing in case where the gradation values included in the video signals satisfy none of the specified conditions. The viewing angle improvement circuit inputs the video signals, having undergone the viewing angle improvement processing for the gradation values in the video signals for the pixels, into only the pixels determined as the objects for the viewing angle improvement processing by the processing object determination circuit (first configuration).

According the first configuration, the liquid crystal display apparatus includes the liquid crystal panel, the processing object determination circuit, and the viewing angle improvement circuit. The processing object determination circuit determines that a pixel is a non-object for the viewing angle improvement processing in case where gradation values, included in the video signals for the pixel, for the sub-pixels numbered in n (n≥2) satisfy the specified conditions and determines that the pixel is an object for the viewing angle improvement processing in case where the gradation values included in the video signals satisfy none of the specified conditions. The specified conditions prescribe the gradation values for the sub-pixels numbered in n which gradation values cause no changes in the color tones between the views of the display surface of the liquid crystal panel from the front direction and from the diagonal direction. The viewing angle improvement circuit carries out the viewing angle improvement processing for the gradations in the video signals to be inputted, for only the pixels determined as the objects for the viewing angle improvement processing by the processing object determination circuit and does not carry out the viewing angle improvement processing for the gradations in the video signals to be inputted into the pixels determined as the non-objects for the viewing angle improvement processing. Thus the viewing angle improvement processing is carried out for only the pixels that display colors whose color tones are changed in the view of the display surface from the diagonal direction in comparison with the view of the display surface from the front direction. In comparison with configurations in which the viewing angle improvement processing is carried out for all the pixels, consequently, viewing angle characteristics for the entire display surface can be improved while occurrence of flickering is reduced.

Provided that the number n is three or greater in the first configuration, the specified conditions may include following conditions (i) to (iii). (i) The gradation values for the sub-pixels numbered in n are equivalent. (ii) The gradation values for at least two or more sub-pixels among the sub-pixels numbered in n are equivalent and the gradation values for the other sub-pixels are zero or within a specified threshold range based on zero. (iii) The gradation value for one sub-pixel among the sub-pixels numbered in n is greater than zero and the gradation values for the other sub-pixels are zero or within the specified threshold range based on zero. The processing object determination circuit may determine that a pixel is an object for the viewing angle improvement processing in case where the gradation values for the sub-pixels numbered in n in the pixel satisfy none of the conditions (i) to (iii) (second configuration).

According the second configuration, the viewing angle characteristics for the entire display surface can be improved while the occurrence of the flickering is reduced.

In the first or second configuration, the pixels each may include three sub-pixels corresponding to colors of red (R), green (G), and blue (B) (third configuration).

In the first or second configuration, the pixels each may include four sub-pixels corresponding to colors of red (R), green (G), blue (B), and yellow (Y) (fourth configuration).

In any of the first to fourth configurations, the viewing angle improvement circuit may provide the high-gradation display on one of adjacent pixels on the liquid crystal panel and the low-gradation display on the other of the adjacent pixels in the viewing angle improvement processing (fifth configuration).

According to the fifth configuration, the occurrence of the flickering can further be reduced in comparison with configurations in which all the pixels are made to provide the high-gradation display or the low-gradation display for each frame.

In any of the first to fifth configurations, for the pixels determined as the objects for the viewing angle improvement processing, the viewing angle improvement circuit may convert the gradation values, prescribed in the video signals to be inputted into the pixels, into gradation values adapted to the high-gradation display or the low-gradation display and may input the gradation values into the pixels and, for the pixels determined as the non-objects for the viewing angle improvement processing, the viewing angle improvement circuit may input the gradation values, prescribed in the video signals to be inputted into the pixels, into the pixels (sixth configuration).

According to the sixth configuration, the gradation values converted from the gradation values in the inputted video signals for the high-gradation display or the low-gradation display are inputted into the pixels determined as the objects for the viewing angle improvement processing and the gradation values in the inputted video signals are inputted into the pixels determined as the non-objects for the viewing angle improvement processing. As a result, the viewing angle characteristics for the entire display surface can be improved while the occurrence of the flickering is reduced in comparison with configurations in which the gradation values converted for the high-gradation display or the low-gradation display are inputted into all the pixels.

Hereinbelow, desirable embodiments of a liquid crystal display apparatus of the disclosure will be described with reference to the drawings. Dimensions of component members in each of the drawings do not truly represent dimensions of real component members, dimensional ratios among the component members, and the like.

[First Embodiment]
<General Configuration>

FIG. 1 illustrates a schematic configuration of a liquid crystal display apparatus 1 according to a first embodiment of the disclosure. The liquid crystal display apparatus 1 includes a liquid crystal panel 11 and a viewing angle improvement control unit 12 that exerts viewing angle improvement control for the liquid crystal panel 11. In the liquid crystal display apparatus 1, a backlight is placed in a thickness direction from the liquid crystal panel 11, though illustration thereof is omitted in FIG. 1.

The liquid crystal display apparatus 1 displays gradations of an image to be displayed on pixels of the liquid crystal panel 11 by making the viewing angle improvement control unit 12 change gradations of input video signals at fixed intervals under certain conditions. In the liquid crystal display apparatus 1, consequently, viewing angle characteristics of a display surface of the liquid crystal panel 11 can be improved.

A schematic configuration of the liquid crystal panel 11 will be described. Though illustration is omitted in FIG. 1, the liquid crystal panel 11 includes an active matrix substrate on which pixels each composed of a plurality of sub-pixels are arranged in a matrix array, an opposed substrate which is placed so as to be opposed to the active matrix substrate, and a liquid crystal layer which is enclosed between the substrates. In the embodiment, the liquid crystal panel 11 is a transmissive liquid crystal panel. The liquid crystal panel 11 may be a reflective or semi-reflective liquid crystal panel. That is, the liquid crystal panel 11 may have any configuration as long as a video can be displayed by the configuration.

On the active matrix substrate, a plurality of gate lines and a plurality of source lines that intersect with the plurality of gate lines are provided. On each sub-pixel defined by the gate lines and the source lines, a thin-film transistor as a switching element and pixel electrodes are provided (illustration of both is omitted).

On the opposed substrate, red (R), green (G), and blue (B) color filters and opposed electrodes are provided (illustration of all is omitted). The sub-pixels each correspond to any of colors of the R, G, and B color filters. That is, one pixel in the embodiment includes three sub-pixels in the colors of R, G, and B.

Though illustration is omitted in FIG. 1, the liquid crystal panel 11 includes a source driver connected to the source lines and a gate driver connected to the gate lines. The liquid crystal panel 11 further includes a timing controller into which synchronization signals such as horizontal synchronization signals (Hsync) and vertical synchronization signals (Vsync) as well as the video signals are inputted. From the timing controller, timing signals based on the horizontal synchronization signals and the vertical synchronization signals are inputted into the source driver and the gate driver.

A gate electrode of each thin-film transistor in the active matrix substrate is connected to the gate driver through the gate line. Based on the timing signals from the timing controller, the gate driver sequentially outputs, to the gate lines, a gate voltage for switching the gate lines into a selected state. When the gate voltage is thus outputted to the gate line, the thin-film transistors connected to the gate line are turned on.

A source electrode of each thin-film transistor is connected to the source driver described above through the source line. Based on the timing signals from the timing controller, the source driver generates gradation display signals that indicate gradation values for the pixels in accordance with the inputted video signals and outputs the gradation display signals to the source lines.

While a gate line is selected, the gradation display signals outputted from the source driver are outputted to the pixels provided with the thin-film transistors through the thin-film transistors connected to the gate line, so that an image is displayed on the pixels.

<Viewing Angle Improvement Control Unit>

The viewing angle improvement control unit 12 carries out viewing angle improvement processing in which the gradation values of the input video signals (hereinafter, input gradation values) are converted for each display frame so as to improve the viewing angle characteristics of the display surface of the liquid crystal panel 11, based on the inputted video signals, and inputs the converted gradation values into the liquid crystal panel 11.

Figure 2:
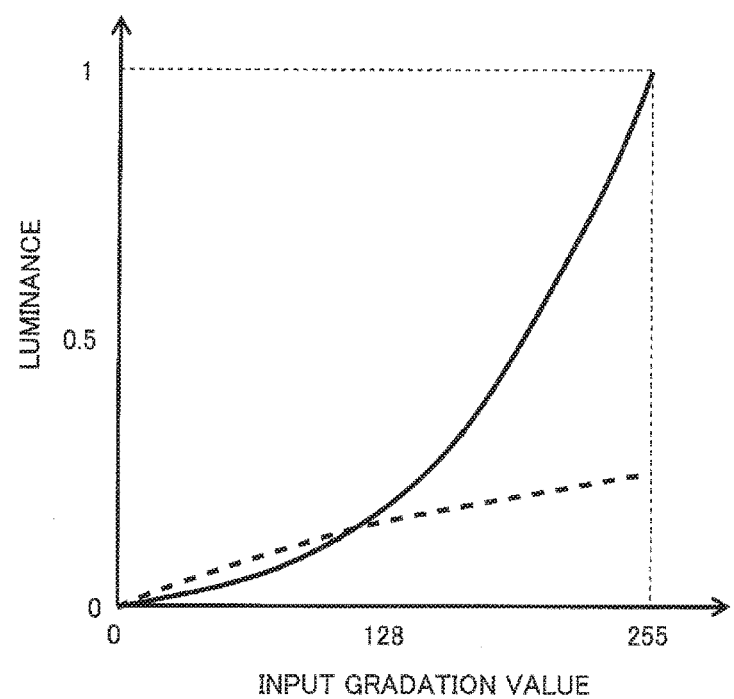
FIG. 2 is a diagram illustrating relations between input gradation values and luminances in views of a display surface from a front direction and from a diagonal direction.

The liquid crystal panel 11 has the viewing angle characteristics in which an appearance (color tone) varies in accordance with a difference in luminance between a view of the display surface from a front direction and a view of the display surface from a diagonal direction. FIG. 2 illustrates response characteristics for the input video signals in which the input gradation values are represented by 8 bits, in the views of the display surface of the liquid crystal panel 11 from the front direction and from the diagonal direction (a 45° direction with respect to the display surface, for instance). In FIG. 2, a solid line represents the response characteristic in the view of the display surface from the front direction and a dashed line represents the response characteristic in the view of the display surface from the diagonal direction. In FIG. 2, normalization is effected so that the luminance in the view from the front direction becomes 1 when the input gradation value is maximal (255).

As illustrated in FIG. 2, a difference exists between the luminance of the display surface viewed from the front direction and the luminance of the display surface viewed from the diagonal direction, except for the input gradation value in the vicinity of 128. A shape of the response characteristic in the view from the diagonal direction greatly differs from a curved shape of the response characteristic in the view from the front direction.

Figure 3:
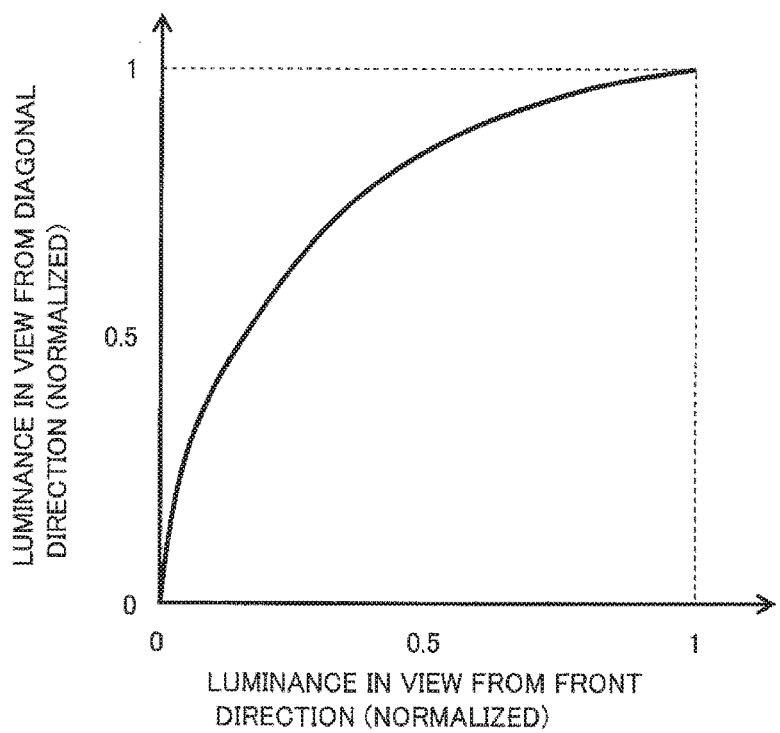
FIG. 3 is a diagram illustrating a relation between the luminances in the views of the display surface from the front direction and from the diagonal direction.

FIG. 3 is a diagram which represents a relation between the luminance in the view from the front direction and the luminance in the view from the diagonal direction under a condition that input gradation values are given to a pixel and in which a relation between the two response characteristics in FIG. 2 is replotted. As illustrated in FIG. 3, the luminance of the display surface viewed from the diagonal direction becomes relatively high under a condition of a halftone.

Occurrence of the difference in the luminance between the views of the display surface from the diagonal direction and from the front direction causes a difference in the appearance, that is, differences in the color tones. Such a phenomenon depends on the gradation values for the R, G, and B sub-pixels in the pixels.

Figure 4A:
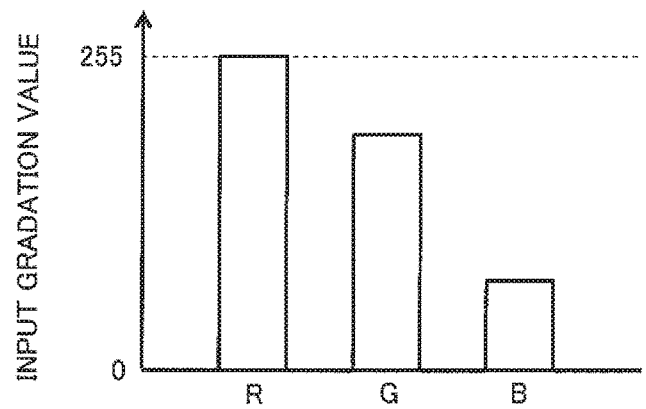
FIG. 4A is a diagram illustrating an example of gradations for sub-pixels in a pixel in the first embodiment.
Figure 4B:
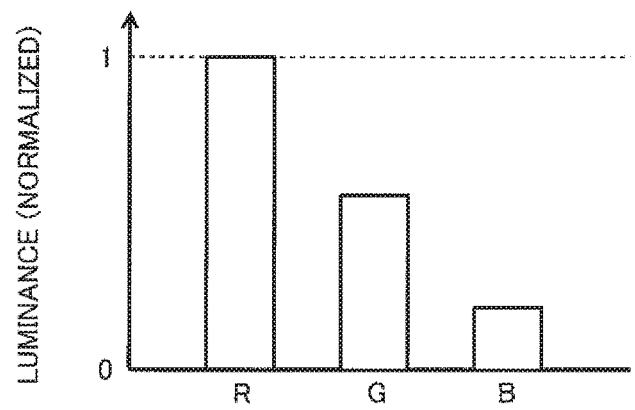
FIG. 4B is a diagram illustrating an example of the luminances of the sub-pixels in the view of the display surface from the front direction, resulting from the gradation values for the sub-pixels shown in FIG. 4A.
Figure 4C:
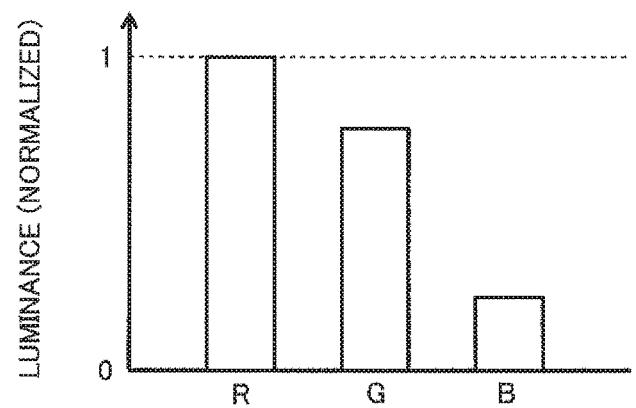
FIG. 4C is a diagram illustrating an example of luminances of the sub-pixels in the view of the display surface from the diagonal direction, resulting from the gradation values for the sub-pixels shown in FIG. 4A.

With use of gradation values shown in FIG. 4A as the gradation values for R, G, and B sub-pixels in one pixel, for instance, luminances of the R, G, and B sub-pixels in the view of the display surface from the front direction are shown in FIG. 4B and luminances of the R, G, and B sub-pixels in the view of the display surface from the diagonal direction are shown in FIG. 4C.

As illustrated in FIGS. 4B and 4C, relative relations among the luminances of the R, G, and B sub-pixels differ between the view of the display surface from the front direction and the view of the display surface from the diagonal direction. In this example, in particular, a luminance ratio of the G sub-pixel to the B sub-pixel is greater in the view of the display surface from the diagonal direction than in the view of the display surface from the front direction. This is because a difference in the direction from which the display surface is viewed causes a variation in the luminance characteristic. Accordingly, a color tone of a pixel differently appears in the view from the front direction and in the view from the diagonal direction. In this example, the color of the pixel appears whiter in the view from the diagonal direction than in the view from the front direction. Such a change in the color tone is prone to be conspicuous to human eyes.

Figure 5A:
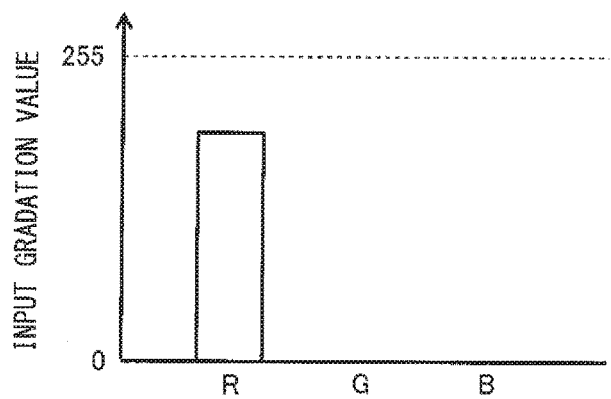
FIG. 5A is a diagram illustrating an example of gradations for sub-pixels in a pixel in the first embodiment.
Figure 5B:
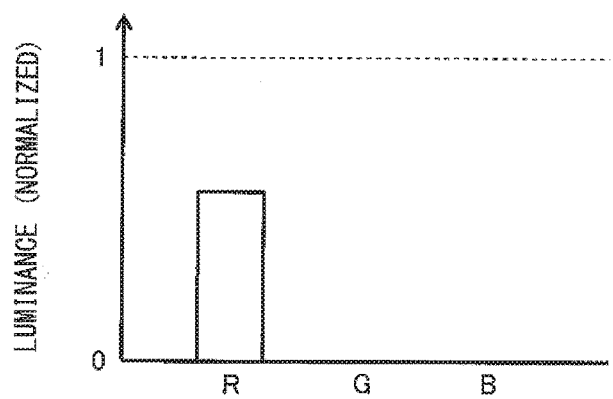
FIG. 5B is a diagram illustrating an example of luminances of the sub-pixels in the view of the display surface from the front direction, resulting from the gradation values for the sub-pixels shown in FIG. 5A.
Figure 5C:
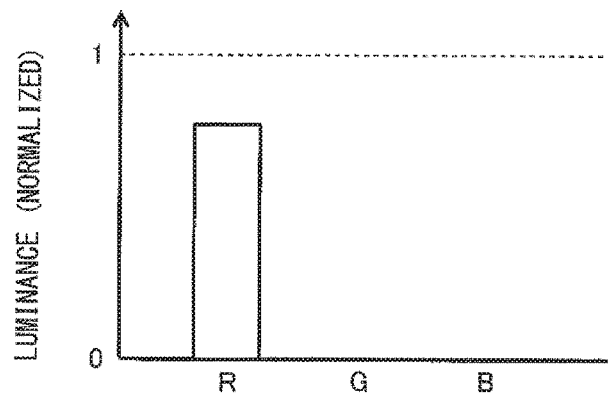
FIG. 5C is a diagram illustrating an example of luminances of the sub-pixels in the view of the display surface from the diagonal direction, resulting from the gradation values for the sub-pixels shown in FIG. 5A.

On the other hand, the color tone in the view of the display surface from the diagonal direction may not differ from the color tone in the view from the front direction. For instance, this may occur in case where a gradation value greater than zero is given to only the R sub-pixel among the R, G, and B sub-pixels in one pixel and where the gradation value of zero is given to the G and B sub-pixels in the pixel, as illustrated in FIG. 5A. In this case, luminances of the R, G, and B sub-pixels in the view of the display surface from the front direction are shown in FIG. 5B and luminances of the R, G, and B sub-pixels in the view of the display surface from the diagonal direction are shown in FIG. 5C. As illustrated in FIGS. 5B and 5C, the luminance of the R sub-pixel in the view from the diagonal direction is higher than the luminance of the R sub-pixel in the view from the front direction. The relative relations (luminance ratios) among the R, G, and B sub-pixels, however, are the same between the view from the front direction and the view from the diagonal direction, so that the color tone of the pixel undergoes no change.

Modes of the R, G, and B gradation values that cause no change in the color tones in the view of the display surface from the diagonal direction in comparison with the view from the front direction are not limited to the above and include following modes (A) to (C), for instance.

(A) The gradation value of the B sub-pixel, among the R, G, and B sub-pixels, may be greater than zero and the gradation values of the R and G sub-pixels may be zero. Alternatively, the gradation value of the G sub-pixel may be greater than zero and the gradation values of the R and B sub-pixels may be zero. Namely, the gradation value of the sub-pixel in one color among the R, G, and B sub-pixels has only to be greater than zero and the gradation values of the sub-pixels in the other two colors have only to be zero. The gradation values of the sub-pixels in the two colors are not limited to zero and may be within a specified threshold range based on zero.

Figure 6:
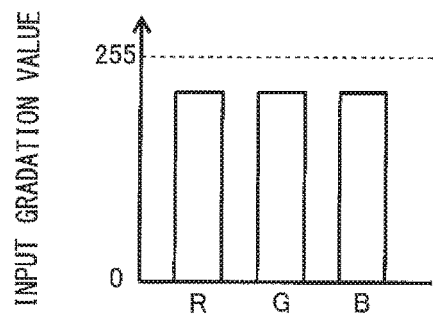
FIG. 6 is a diagram illustrating an example of gradations for sub-pixels in a pixel in the first embodiment.

(B) As illustrated in FIG. 6, the gradation values for the R, G, and B sub-pixels in one pixel may be the same. The gradation values of the R, G, and B sub-pixels in this mode are not limited to the gradation values being the same and a difference among the gradation values of the sub-pixels may be within a specified threshold range.

Figure 7A:
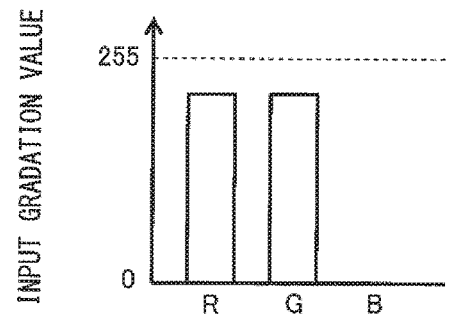
FIG. 7A is a diagram illustrating an example of gradations for sub-pixels in a pixel in the first embodiment.
Figure 7B:
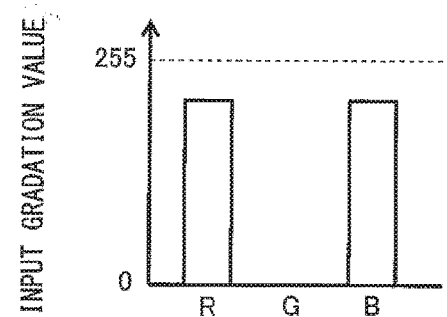
FIG. 7B is a diagram illustrating an example of gradations for the sub-pixels that is different from the example of FIG. 7A.
Figure 7C:
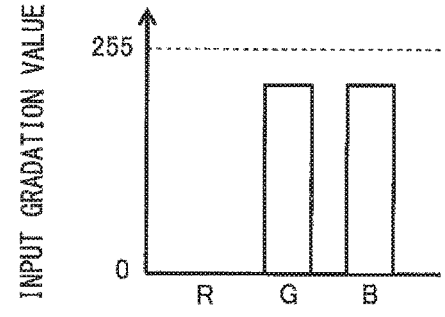
FIG. 7C is a diagram illustrating an example of gradations for the sub-pixels that is different from the examples of FIGS. 7A and 7B.

(C) As illustrated in FIGS. 7A to 7C, the gradation values for sub-pixels in desired two colors among the R, G, and B sub-pixels in one pixel may be the same and the gradation value for the other sub-pixel may be zero. Without limitation to a case where the gradation values for sub-pixels in the desired two colors are the same, a difference between the gradation values for the two sub-pixels may be within a specified threshold range. The gradation value for the other sub-pixel is not limited to zero and may be within a specified threshold range based on zero.

In the modes (A) to (C), the color tones do not change but only the luminance changes between the view of the display surface from the diagonal direction and the view of the display surface from the front direction and such a change is less conspicuous to human eyes. In general, flickering is made prone to occur when gradations of an image are greatly changed every display frame. That is, the flickering is prone to occur when control by which a high-gradation image and a low-gradation image are alternately displayed is exerted as the viewing angle improvement control.

In the embodiment, when the input gradation values for a pixel are gradation values that may change the color tones in the view of the display surface from the diagonal direction in comparison with the view from the front direction, the viewing angle improvement control unit 12 carries out the viewing angle improvement processing for the pixel. Hereinbelow, specific configurations of the viewing angle improvement control unit 12 will be described.

As illustrated in FIG. 1, the viewing angle improvement control unit 12 includes a processing object determination circuit 21 and a viewing angle improvement circuit 22. The processing object determination circuit 21 determines whether each pixel on the liquid crystal panel 11 is an object pixel to be subjected to the viewing angle improvement processing or not, based on the gradation values for the sub-pixels of the pixel. More specifically, the processing object determination circuit 21 determines whether each pixel on the liquid crystal panel 11 is an object pixel for the viewing angle improvement processing or not, in accordance with a determination processing flow illustrated in FIG. 8.

Figure 8:
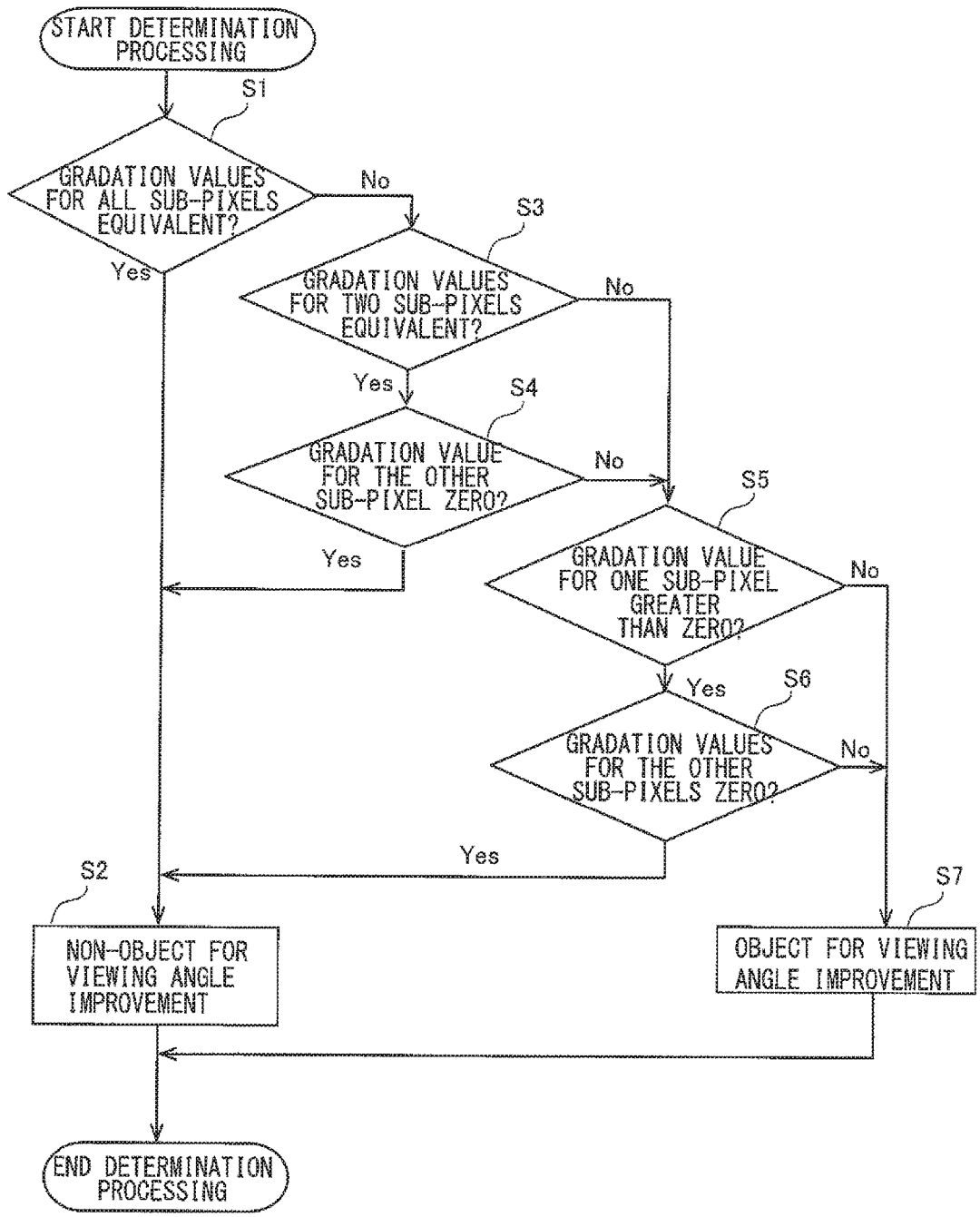
FIG. 8 is an operation flow chart for a processing object determination circuit illustrated in FIG. 1.

In FIG. 8, if the gradation values for all the sub-pixels in a pixel are equivalent (step S1: Yes), the processing object determination circuit 21 determines that the pixel is a non-object for the viewing angle improvement processing (step S2). If the gradation values for two sub-pixels in the pixel are equivalent and if the gradation value for the other sub-pixel is zero (steps S3 and S4: Yes), the processing object determination circuit 21 determines that the pixel is a non-object for the viewing angle improvement processing (step S2). If the gradation value for one sub-pixel in the pixel is greater than zero and if the gradation values for the other sub-pixels are zero (steps S5 and S6: Yes), the processing object determination circuit 21 determines that the pixel is a non-object for the viewing angle improvement processing (step S2). That is, if the gradation values of the sub-pixels in the pixel fulfill any of the modes (A) to (C), it is determined that the pixel is a non-object for the viewing angle improvement processing.

On the other hand, if the gradation values for the sub-pixels in the pixel fulfill none of steps S1, S3, and S5 (steps S1, S3, and S5: No) or if the gradation values do not fulfill steps S4 and S6 (steps S4 and S6: No) even though fulfilling steps S3 and S5 (steps S3 and S5: Yes), the processing object determination circuit 21 determines that the pixel is an object pixel for the viewing angle improvement processing (step S7). That is, if the gradation values for the sub-pixels in the pixel fulfill none of the modes (A) to (C), it is determined that the pixel is an object pixel for the viewing angle improvement processing.

Figure 9:
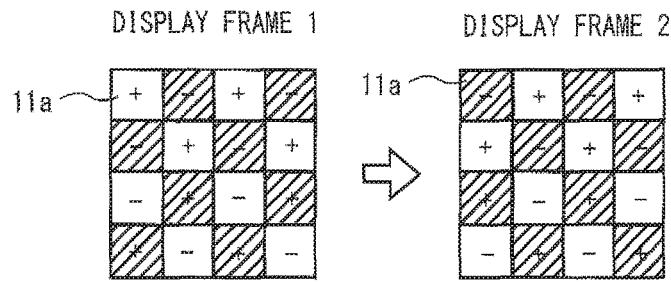
FIG. 9 is a diagram for description on pixels on which high-gradation display and low-gradation display are provided every display frame.

As illustrated in FIG. 9, the viewing angle improvement circuit 22 provides different gradation displays of a high-gradation display (shaded parts in FIG. 9) and a low-gradation display (white parts in FIG. 9) on adjacent pixels 11a on the display surface of the liquid crystal panel 11. The viewing angle improvement circuit 22 switches the gradation display on each pixel every display frame. Pixels to be subjected to the high-gradation display or the low-gradation display, however, are limited to pixels determined as the object pixels for the viewing angle improvement processing by the processing object determination circuit 21. In the embodiment, polarities are reversed every two lines on the liquid crystal panel 11 for reduction in burn-in of the liquid crystal panel 11. Signs "+" and "−" shown on the pixels 11a in FIG. 9 represent polarities of drive voltages for the pixels.

Figure 10A:
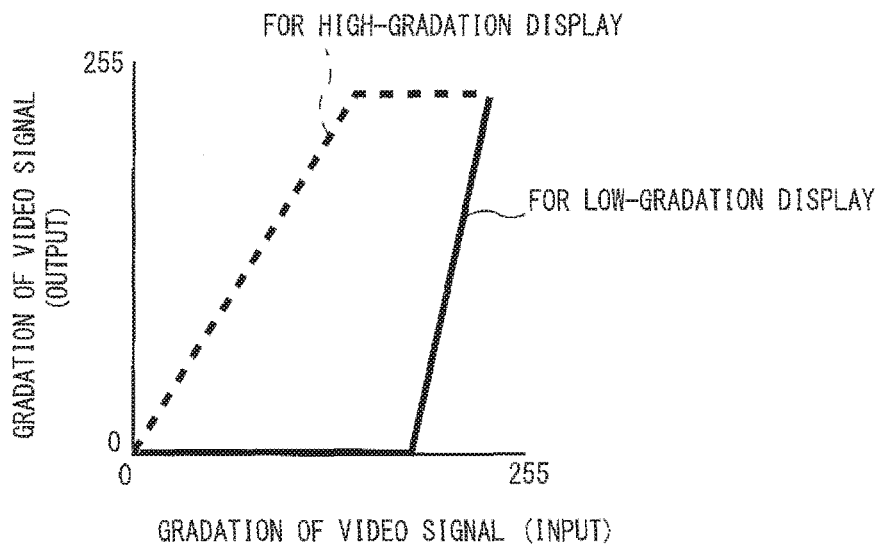
FIG. 10A is a diagram illustrating output gradation values resulting from input gradation values for pixels determined as object pixels for viewing angle improvement in FIG. 8.

As illustrated in FIG. 1, the viewing angle improvement circuit 22 includes a gradation conversion unit 23. The gradation conversion unit 23 converts the input gradation values, for the pixels determined as the object pixels for the viewing angle improvement processing by the processing object determination circuit 21, into gradation values for the high-gradation display or the low-gradation display and outputs the resultant gradation values to the liquid crystal panel 11. For the high-gradation display of the object pixels, the input gradation values for the object pixels are converted into output gradation values shown by a dashed line in FIG. 10A. On condition that the object pixels are present on positions of the pixels to be subjected to the high-gradation display in a display frame, accordingly, the object pixels are displayed with the gradation values higher than the input gradation values. For the low-gradation display of the object pixels, the input gradation values for the object pixels are converted into output gradation values shown by a solid line in FIG. 10A. On condition that the object pixels are present on positions of the pixels to be subjected to the low-gradation display in a display frame, accordingly, the object pixels are displayed with the gradation values lower than the input gradation values. Thus the viewing angle characteristics are improved for the pixels that display the colors whose color tones are changed in the view of the display surface from the diagonal direction in comparison with the view of the display surface from the front direction.

Figure 10B:
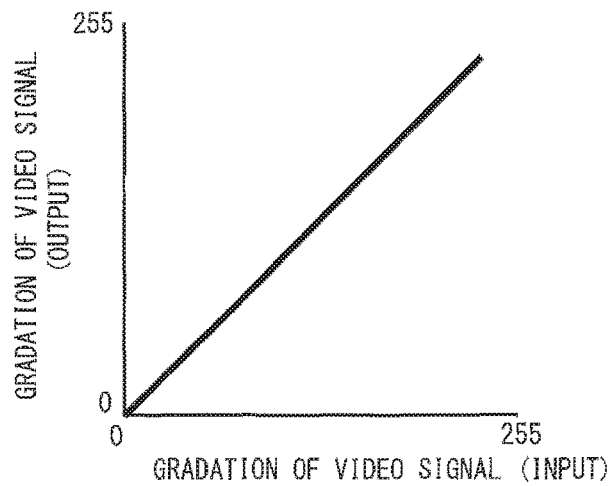
FIG. 10B is a diagram illustrating output gradation values resulting from input gradation values for pixels not determined as the object pixels for the viewing angle improvement in FIG. 8.

For the pixels determined as the non-objects for the viewing angle improvement processing by the processing object determination circuit 21, the gradation conversion unit 23 converts the input gradation values into output gradation values shown in FIG. 10B and outputs the resultant gradation values to the liquid crystal panel 11. Even for the pixels that are supposed to be subjected to the high-gradation display or the low-gradation display, namely, the input gradation values are thus converted into the gradation values substantially the same as the input gradation values and the resultant gradation values are outputted. Thus the occurrence of the flickering as a harmful effect of the viewing angle improvement control can be avoided on the pixels that display colors whose color tones are hardly changed in the view of the display surface from the diagonal direction in comparison with the view of the display surface from the front direction.

On condition that the polarities are reversed every two lines on the liquid crystal panel 11, pixels to be subjected to the high-gradation display may have the positive polarity at all times on upper half two lines in FIG. 9 and may have the negative polarity at all times on lower half two lines in FIG. 9. Then brightness of the image slightly may differ between the upper half two lines and the lower half two lines in FIG. 9 and such a difference in the brightness may look like horizontal lines on the display surface of the liquid crystal panel 11. In FIG. 9, in other words, banding may occur on the liquid crystal panel 11. In the embodiment, the viewing angle improvement processing is carried out for only the input gradation values for the object pixels for the viewing angle improvement processing, that is, the pixels that display the colors whose color tones are changed in the view of the display surface from the diagonal direction in comparison with the view of the display surface from the front direction. As a result, occurrence of the banding can be reduced in comparison with configurations in which the viewing angle improvement processing is carried out for all the pixels.

In the liquid crystal display apparatus with use of the liquid crystal panel in which the plurality of pixels each composed of the three sub-pixels of R, G, and B are formed, in the first embodiment described above, the viewing angle improvement processing is carried out for the pixels that display the colors whose color tones are changed in the view of the display surface from the diagonal direction in comparison with the view of the display surface from the front direction. On the other hand, the viewing angle improvement processing is not carried out for the pixels that display the colors whose color tones are hardly changed in the view of the display surface from the diagonal direction in comparison with the view of the display surface from the front direction. Thus the occurrence of the flickering or the like that is caused by the viewing angle improvement processing can be reduced in portions of the colors for which the viewing angle improvement is the less effective while the viewing angle improvement processing is carried out in portions of the colors for which the viewing angle improvement is the more effective.

[Second Embodiment]

An example in which each pixel includes the three sub-pixels has been described as the first embodiment described above, whereas an example in which each pixel includes four sub-pixels will be described as the present embodiment. Hereinbelow, configurations of the embodiment that are different from the configurations of the first embodiment will be described principally.

Figure 11:
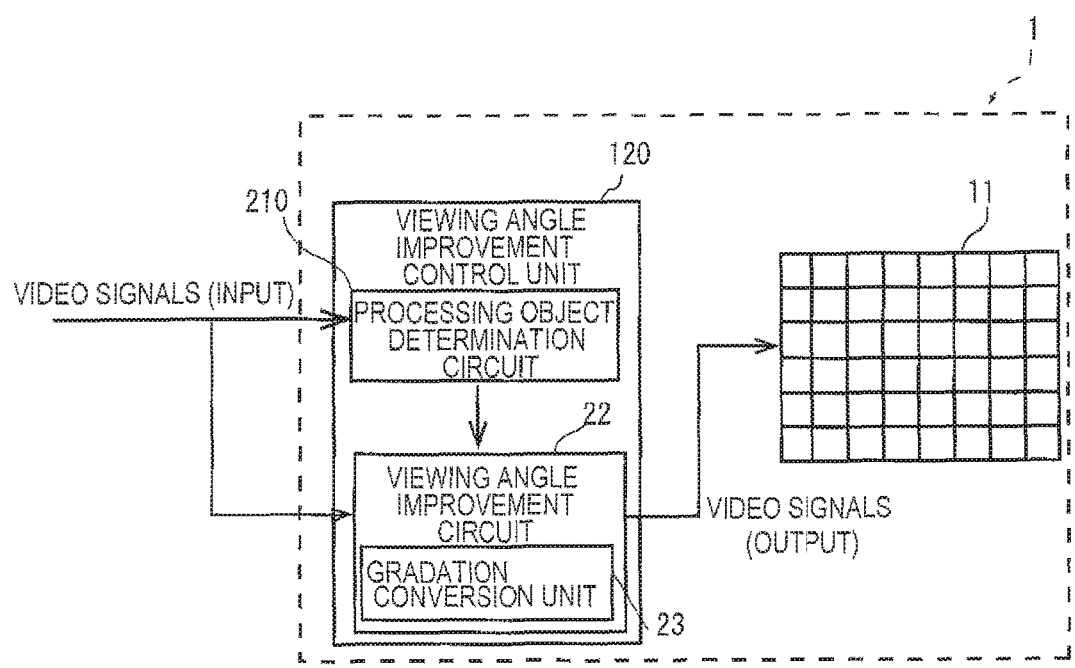
FIG. 11 is a block diagram illustrating a schematic configuration of a liquid crystal display apparatus according to a second embodiment.

FIG. 11 is a functional block diagram illustrating a liquid crystal display apparatus of the embodiment. In FIG. 11, the same configurations as those of the first embodiment are provided with the same reference numerals as those for the first embodiment.

As illustrated in FIG. 11, a liquid crystal panel 110 in the liquid crystal display apparatus 100 includes color filters in four colors R, G, B, and yellow (Y) in an opposed substrate (illustration is omitted). An active matrix substrate (illustration is omitted) in the liquid crystal panel 110 includes a plurality of pixels each composed of four sub-pixels corresponding to the colors R, G, B, and Y.

In a configuration in which the pixels each include the four sub-pixels of R, G, B, and Y, modes of gradation values for the sub-pixels that cause no change in color tones of the pixel in a view of a display surface from the diagonal direction in comparison with a view of the display surface from the front direction are as follows.

(a) The gradation values for the four sub-pixels of R, G, B, and Y are equivalent.

(b) The gradation values for desired three sub-pixels among the four sub-pixels of R, G, B, and Y are equivalent and the gradation value for the other one sub-pixel is zero.

(c) The gradation values for desired two sub-pixels among the four sub-pixels of R, G, B, and Y are equivalent and the gradation values for the other two sub-pixels are zero.

(d) The gradation value for desired one sub-pixel among the four sub-pixels of R, G, B, and Y is greater than zero and the gradation values for the other three sub-pixels are zero.

In the above modes (a) to (d), the equivalent gradation values encompass not only gradation values that are identical but also gradation values among which a difference is within a specified threshold range. In the modes (b) to (d), the gradation values for the other sub-pixels are not limited to zero but may be within a specified threshold range based on zero.

In case where the gradation values for the R, G, B, and Y sub-pixels in a pixel fulfill none of the modes (a) to (d), a processing object determination circuit 210 in the viewing angle improvement control unit 120 illustrated in FIG. 11 determines that the pixel is an object pixel for the viewing angle improvement processing. Specifically, the processing object determination circuit 210 determines whether the pixel is an object pixel for the viewing angle improvement processing or not, in accordance with a determination flow illustrated in FIG. 12.

Figure 12:
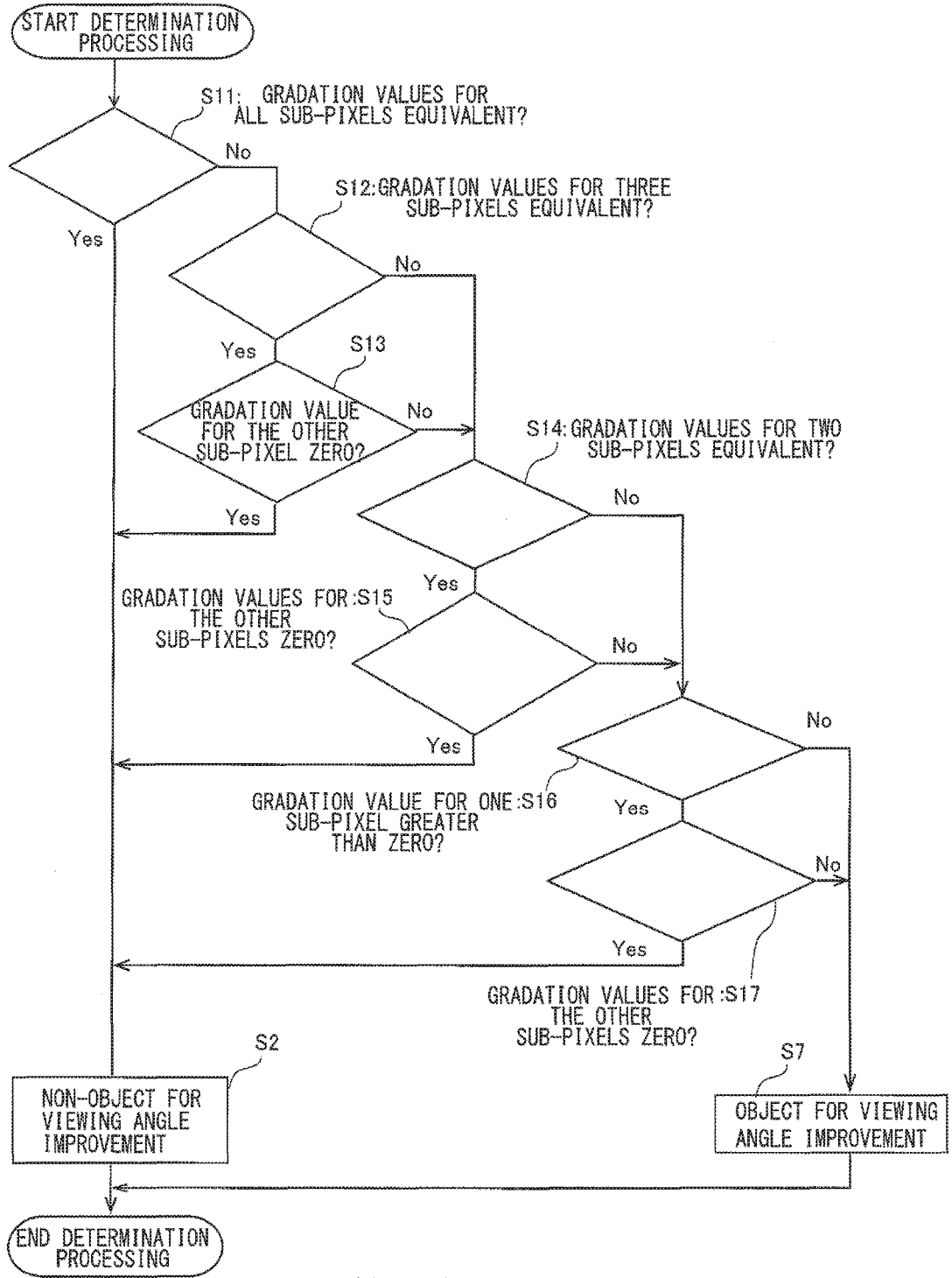
FIG. 12 is an operation flow chart for a processing object determination circuit illustrated in FIG. 11.

In FIG. 12, if the gradation values for all the sub-pixels in the pixel are equivalent (step S11: Yes), the processing object determination circuit 210 determines that the pixel is a non-object for the viewing angle improvement processing (step S2). If the gradation values for three sub-pixels in the pixel are equivalent and if the gradation value for the other sub-pixel is zero (steps S12 and S13: Yes), the processing object determination circuit 210 determines that the pixel is a non-object for the viewing angle improvement processing (step S2). If the gradation values for two sub-pixels in the pixel are equivalent and if the gradation values for the other sub-pixels are zero (steps S14 and S15: Yes), the processing object determination circuit 210 determines that the pixel is a non-object for the viewing angle improvement processing (step S2). If the gradation value for one sub-pixel in the pixel is greater than zero and if the gradation values for the other sub-pixels are zero (steps S16 and S17: Yes), the processing object determination circuit 210 determines that the pixel is a non-object for the viewing angle improvement processing (step S2).

On the other hand, in FIG. 12, if the gradation values of the sub-pixels in the pixel fulfill none of steps S11, S12, S14, and S16 (steps S11, S12, S14, and S16: No) or if the gradation values do not fulfill step S13, S15, or S17 (step S13, S15, or S17: No) even though fulfilling the corresponding step S12, S14, or S16 (step S12, S14, or S16: Yes), it is determined that the pixel is an object pixel for the viewing angle improvement processing (step S7).

In the liquid crystal display apparatus with use of the liquid crystal panel in which the pixels each composed of the four sub-pixels of R, G, B, and Y are formed, in the second embodiment, the viewing angle improvement processing is carried out for the input gradation values for the pixels that display colors whose color tones are changed in the view of the display surface from the diagonal direction in comparison with the view of the display surface from the front direction. On the other hand, the viewing angle improvement processing is not carried out for the input gradation values for the pixels that display colors whose color tones are hardly changed in the view of the display surface from the diagonal direction in comparison with the view of the display surface from the front direction. Thus the occurrence of the flickering that is caused by the viewing angle improvement processing can be reduced in portions in the colors for which the viewing angle improvement is the less effective while the viewing angle improvement processing is carried out for portions in the colors for which the viewing angle improvement is the more effective. As a result, effects of the viewing angle improvement can efficiently be obtained and the occurrence of the flickering that is caused by the viewing angle improvement processing can be reduced as much as possible.

[Other Embodiments]

Though the embodiments of the disclosure have been described above, the embodiments described above are merely examples for embodying the disclosure. Accordingly, the disclosure is not limited to the embodiments described above and the embodiments can be implemented with appropriate modifications without departing from the purport of the disclosure.

(1) As the first and second embodiments described above, examples have been described in which the viewing angle improvement processing is carried out so that the adjacent pixels 11a make the different gradation displays (the high-gradation display or the low-gradation display) as illustrated in FIG. 9. The embodiments, however, may be implemented as follows. Switching between the high-gradation display and the low-gradation display for each frame may be performed so that all the pixels may make the high-gradation display or the low-gradation display in one frame. In this configuration as well, however, pixels to be subjected to the high-gradation display or the low-gradation display are limited to the pixels determined as the object pixels for the viewing angle improvement processing by the processing object determination circuit 21, 210, as with the first and second embodiments described above.

Such a configuration also may improve the viewing angle characteristics in the pixels that display the colors whose color tones are changed in the view of the display surface from the diagonal direction in comparison with the view of the display surface from the front direction. In addition, the occurrence of the flickering that is caused by the viewing angle improvement processing can be reduced in the pixels that display the colors whose color tones are hardly changed in the view of the display surface from the diagonal direction in comparison with the view of the display surface from the front direction.

(2) Though the example in which the pixels are each composed of the R, G, B, and Y sub-pixels has been described as the second embodiment described above, the pixels may each be composed of R, G, B, and white (W) sub-pixels, for instance. The four sub-pixels may include a plurality of sub-pixels in the same color so as to be [R, R, G, B], [R, G, B, G], or the like, for instance. The pixels may each be composed of five sub-pixels [R, R, R, G, B], for instance.

(3) In the embodiments described above, the pixels may each be composed of two sub-pixels. In this configuration, it is determined based on two conditions below whether a pixel is an object pixel for the viewing angle improvement processing or not. The pixel is determined as an object pixel for the viewing angle improvement processing in case where the pixel satisfies neither a condition that gradation values inputted into the two sub-pixels are equivalent nor a condition that a gradation value inputted into one of the sub-pixels is greater than zero and that a gradation value inputted into the other of the sub-pixels is zero. On the other hand, the pixel is determined as a non-object for the viewing angle improvement processing in case where the pixel satisfies at least either of the two conditions.

(4) The following can be generalized from the first and second embodiments described above and examples referred to in the above paragraphs (2) and (3).

Provided that a pixel is composed of sub-pixels numbered in n (n is an integer equal to or greater than two), the pixel is determined as a non-object for the viewing angle improvement processing under any of three conditions below.

(i) Gradation values for the sub-pixels numbered in n are equivalent.

(ii) Gradation values for at least two or more sub-pixels among the sub-pixels numbered in n are equivalent and gradation values for the other sub-pixels are zero.

(iii) A gradation value for one sub-pixel among the sub-pixels numbered in n is greater than zero and gradation values for the other sub-pixels are zero.

In the above conditions (i) to (iii), the equivalent gradation values encompass not only gradation values that are identical but gradation values among which a difference is within a specified threshold range. In the above conditions (i) to (iii), the gradation values for the other sub-pixels are not limited to zero but may be within a specified threshold range based on zero.

In the first embodiment described above, n=3 holds. The modes (A), (B), and (C) on the sub-pixels in this configuration respectively correspond to the conditions (iii), (i), and (ii).

In the second embodiment described above, n=4 holds. The modes (a) to (d) on the sub-pixels in this configuration have such correspondence relations with the conditions (i) to (iii) as follows. The mode (a) corresponds to the condition (i). The modes (b) and (c) correspond to the condition (ii). The mode (d) corresponds to the condition (iii).

In case where each pixel is composed of two sub-pixels as described in the paragraph (3), that is, in case where n=2 holds, there are such correspondence relations with the conditions (i) to (iii) as follows. A case where gradation values inputted into the two sub-pixels are equivalent corresponds to the condition (i). A case where a gradation value inputted into either of the sub-pixels is greater than zero and where a gradation value inputted into the other sub-pixel is zero corresponds to the condition (iii). There is no mode corresponding to the condition (ii). Accordingly, modes corresponding to the conditions (i) to (iii) necessarily exist in case where n is equal to or greater than three.

In cases of n=2, 3, or 4, therefore, the modes in which a pixel is determined as a non-object for the viewing angle improvement processing each correspond to any of the conditions (i) to (iii). In cases of n=5 or greater, as well, modes in which a pixel is determined as a non-object for the viewing angle improvement processing each correspond to any of the conditions (i) to (iii).

(5) Functional blocks for the liquid crystal display apparatuses described as the embodiments may be configured as one computer. Alternatively, the functional blocks may separately be made into single chips with use of semiconductor devices such as LSIs or some or all of the functional blocks may be integrated on a single chip. The LSIs mentioned herein may be referred to as ICs, system LSIs, super LSIs, or ultra LSIs in accordance with degree of integration. Technology of forming the integrated circuits may be achieved by use of dedicated circuits or general-purpose processors without limitation to LSIs. Field programmable gate arrays (FPGAs) that can be programmed after manufacture of the LSIs or reconfigurable processors in which connection or setting of circuit cells inside the LSI can be reconfigured may be used. Furthermore, in case where a new technology for forming integrated circuits that replace LSIs is developed as a result of progress in semiconductor technology or other technologies derived therefrom, the functional blocks may be integrated with use of such technology, as a matter of course. Such possibility may include application of biotechnology.

(6) A portion or all of processing in each functional block in the embodiments may be implemented as programs. A portion or all of the processing in each functional block in the embodiments may be carried out by central processing units (CPUs), microprocessors, processors, or the like in computers. The programs for the processing are stored in storage devices such as hard disks and ROMs and are executed on the ROMs or after being read out onto RAMs. The storage devices (storage media) are not temporary but material. For instance, tapes, disks, cards, semiconductor memories, programmable logic circuits, or the like may be used as the storage devices.

(7) The processing in the embodiments may be implemented by hardware or may be implemented by software (including implementation with operating system (OS), middleware, or specified libraries). The processing may be implemented by mixed processing of software and hardware. In case where a digital content provision system according to the embodiments is implemented by hardware, it goes without saying that timing adjustment for the processing is demanded. Regarding the embodiments, description on details of timing adjustment for various signals to be performed in actual hardware designing are omitted for convenience.

The present disclosure contains subject matter related to that disclosed in Japanese Priority Patent Application JP 2016-220441 filed in the Japan Patent Office on Nov. 11, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display apparatus comprising:
    a liquid crystal panel including a plurality of pixels each including sub-pixels numbered in n, where n is an integer equal to or greater than two;
    a viewing angle improvement circuit that carries out viewing angle improvement processing in which switching between high-gradation display with conversion into a gradation higher than a gradation specified by video signals to be inputted into each of the plurality of pixels and low-gradation display with conversion into a gradation lower than the gradation specified by the video signals is carried out every frame, for each of the plurality of pixels; and
    a processing object determination circuit that determines, for each of the plurality of pixels, that the pixel is a non-object for the viewing angle improvement processing in case where gradation values, included in the video signals for the pixel, for the sub-pixels numbered in n satisfy specified conditions prescribing gradation values for the sub-pixels numbered in n which gradation values cause no changes in color tones between views of a display surface of the liquid crystal panel from a front direction and from a diagonal direction and that determines that the pixel is an object for the viewing angle improvement processing in case where the gradation values included in the video signals satisfy none of the specified conditions, wherein
    the viewing angle improvement circuit inputs the video signals, having undergone the viewing angle improvement processing for the gradation values in the video signals for the pixels, into only the pixels determined as the objects for the viewing angle improvement processing by the processing object determination circuit, wherein
    provided that the number n is three or greater,
    the specified conditions include following conditions (i) to (iii) in which
        (i) the gradation values for the sub-pixels numbered in n are equivalent,
        (ii) the gradation values for at least two or more sub-pixels among the sub-pixels numbered in n are equivalent and the gradation values for the other sub-pixels are zero or within a specified threshold range based on zero, and
        (iii) the gradation value for one sub-pixel among the sub-pixels numbered in n is greater than zero and the gradation values for the other sub-pixels are zero or within the specified threshold range based on zero, and the processing object determination circuit determines that a pixel is an object for the viewing angle improvement processing in case where the gradation values for the sub-pixels numbered in n in the pixel satisfy none of the conditions (i) to (iii).

2. The liquid crystal display apparatus according to claim 1, wherein the pixels each include three sub-pixels corresponding to colors of red, green, and blue.

3. The liquid crystal display apparatus according to claim 1, wherein the pixels each include four sub-pixels corresponding to colors of red, green, blue, and yellow.

4. The liquid crystal display apparatus according to claim 1, wherein the viewing angle improvement circuit provides the high-gradation display on one of adjacent pixels on the liquid crystal panel and the low-gradation display on the other of the adjacent pixels in the viewing angle improvement processing.

5. The liquid crystal display apparatus according to claim 1, wherein, for the pixels determined as the objects for the viewing angle improvement processing, the viewing angle improvement circuit converts the gradation values, prescribed in the video signals to be inputted into the pixels, into gradation values adapted to the high-gradation display or the low-gradation display and inputs the gradation values into the pixels and, for the pixels determined as the non-objects for the viewing angle improvement processing, the viewing angle improvement circuit inputs the gradation values, prescribed in the video signals to be inputted into the pixels, into the pixels.

* * * * *